(12) United States Patent
Yamada (10) Patent No.: US 8,934,106 B2
(45) Date of Patent: Jan. 13, 2015

(54) IMAGE PROCESSING DEVICE CAPABLE OF SWITCHING CONTROL MODES

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 702 days.

(21) Appl. No.: 12/913,489

(22) Filed: Oct. 27, 2010

(65) Prior Publication Data

US 2011/0191846 A1    Aug. 4, 2011

(30) Foreign Application Priority Data

Jan. 29, 2010   (JP) ................................. 2010-017819

(51) Int. Cl.
  *G06F 3/12*   (2006.01)
  *G06F 9/24*   (2006.01)
  *G06F 21/00*  (2013.01)

(52) U.S. Cl.
  CPC . *G06F 9/24* (2013.01); *G06F 21/00* (2013.01)
  USPC ......... 358/1.13; 358/1.15; 358/1.16; 358/1.9; 358/501; 358/401; 726/21; 726/26; 726/27; 726/28; 726/29; 726/30

(58) Field of Classification Search
  None
  See application file for complete search history.

(56) References Cited

U.S. PATENT DOCUMENTS

| | | | |
|---|---|---|---|
| 7,755,792 B2 * | 7/2010 | Sakayama et al. | 358/1.15 |
| 7,894,085 B2 * | 2/2011 | Maeda | 358/1.13 |
| 7,941,844 B2 * | 5/2011 | Anno | 726/17 |
| 2007/0127051 A1 * | 6/2007 | Sakayama et al. | 358/1.14 |
| 2008/0218798 A1 * | 9/2008 | Shigehisa et al. | 358/1.16 |
| 2008/0244756 A1 * | 10/2008 | Kitada | 726/28 |
| 2009/0094135 A1 * | 4/2009 | Synder | 705/26 |
| 2009/0248862 A1 | 10/2009 | Yamamoto | |
| 2009/0296163 A1 * | 12/2009 | Koura | 358/403 |
| 2010/0245866 A1 * | 9/2010 | Minamikawa | 358/1.9 |

FOREIGN PATENT DOCUMENTS

| | | |
|---|---|---|
| JP | H08-101609 A | 4/1996 |
| JP | 2000-141831 A | 5/2000 |
| JP | 2000-353070 A | 12/2000 |
| JP | 2007-105917 A | 4/2007 |
| JP | 2007105917 A * | 4/2007 |
| JP | 2007-124309 A | 5/2007 |
| JP | 2008-311867 A | 12/2008 |
| JP | 2009-237675 A | 10/2009 |
| JP | 2009237675 A * | 10/2009 |

OTHER PUBLICATIONS

Japan Patent Office, Office Action for Japanese Patent Application No. 2010-017819, mailed Jan. 5, 2012.

* cited by examiner

*Primary Examiner* — Hilina K Demeter

(74) *Attorney, Agent, or Firm* — Baker Botts L.L.P.

(57) ABSTRACT

An image processing device includes a processing unit that performs processing on image data, an obtaining unit that obtains a number of users, and a control unit that executes a job by controlling the processing unit to perform the processing in one of control modes. The control unit switches between the control modes based on the number of users.

16 Claims, 9 Drawing Sheets

|  | PC PRINT | PC SCAN | PC FAX |
|---|---|---|---|
| USER1 | ○ | ○ | ○ |
| USER2 |  |  | ○ |
| USER3 | ○ | ○ | ○ |
| USER4 | ○ | ○ |  |
| USER5 |  | ○ | ○ |
| USER6 |  | ○ | ○ |
| USER7 |  | ○ |  |
| USER8 | ○ | ○ | ○ |

|  | PC PRINT | PC SCAN | PC FAX |
|---|---|---|---|
| USER1 | 30 MIN | 10 MIN | 20 MIN |
| USER2 |  |  | 8 MIN |
| USER3 | 10 MIN | 20 MIN | 50 MIN |
| USER4 | 15 MIN | (80 MIN) |  |
| USER5 |  | 14 MIN | 52 MIN |
| USER6 |  | (70 MIN) | (90 MIN) |
| USER7 |  | (65 MIN) |  |
| USER8 | 35 MIN | 40 MIN | 15 MIN |

| COMPUTER NAME | PC1 | PC2 | PC3 | PC4 | PC5 |
|---|---|---|---|---|---|
| NON-ACCESSED TIME | 30 MIN | 5 MIN | 13 MIN | (80 MIN) | 40 MIN |

| USER NAME | USER1 | USER2 | USER3 | USER4 | USER5 | USER6 |
|---|---|---|---|---|---|---|
| PERMISSION | ○ |  | ○ | ○ |  | ○ |

IMAGE PROCESSING DEVICE CAPABLE OF SWITCHING CONTROL MODES

CROSS REFERENCE TO RELATED APPLICATION

This application claims priority from Japanese Patent Application No. 2010-017819 filed Jan. 29, 2010. The entire content of this priority application is incorporated herein by reference.

TECHNICAL FIELD

The present invention relates to an image processing device, and particularly to an image processing device having a function to switch control modes of a control unit.

BACKGROUND

There has been provided an image processing device capable of executing a job including processing of image data, such as scanning, PC printing, facsimile transmission, and the like, and also capable of switching control modes of a control unit. For example, Japanese Patent-Application Publication No. H8-101609 discloses an image processing device including a main controller having a higher-speed CPU and a sub-controller having a lower-speed CPU. Normally, the main controller controls a printer unit and the like, and the sub-controller controls an interface to an external device. In a power-saving mode, however, the main controller is put into a halt state, and only the sub-controller is maintained in an active state, thereby saving power consumption.

It has been considered to switch between a plurality of different control modes when executing jobs so as to improve efficiency. In general, more jobs are expected to be executed at a higher speed in a higher control mode having a higher performance capacity. Thus, in a condition where a large number of jobs are received in a short period of time, efficiency can be enhanced by selecting the higher control mode.

SUMMARY

However, a conventional technique does not always select an efficient control mode suited to status of use of an image processing device.

In view of the foregoing, it is an object of the invention to provide an image processing device that can perform efficient control in accordance with state of use of the image processing device.

In order to attain the above and other objects, the invention provides an image processing device including a processing unit that performs processing on image data, an obtaining unit that obtains a number of users, and a control unit that executes a job by controlling the processing unit to perform the processing in one of control modes. The control unit switches between the control modes based on the number of users.

According to another aspect, the present invention provides an image processing device including a connection unit connectable to a plurality of terminal devices, each capable of inputting a job to the image processing device, a processing unit that performs processing on image data, an obtaining unit that obtains a number of terminal devices connected to the connection unit, and a control unit that executes a job received through the connection unit by controlling the processing unit to perform the processing in one of control modes. The control unit switches between the control modes based on the number of terminal devices.

BRIEF DESCRIPTION OF THE DRAWINGS

The particular features and advantages of the invention as well as other objects will become apparent from the following description taken in connection with the accompanying drawings, in which.

DETAILED DESCRIPTION

Image processing devices according to embodiments of the invention will be described while referring to the accompanying drawings wherein like parts and components are designated by the same reference numerals to avoid duplicating description.

A printer 1 as an image processing device according to a first embodiment of the present invention will be described with reference to FIGS. 1 to 5. The printer 1 is a multifunction device capable of executing a plurality of functions, including a printer function, a copier function, a scanner function, and a facsimile function.

Figure 1:
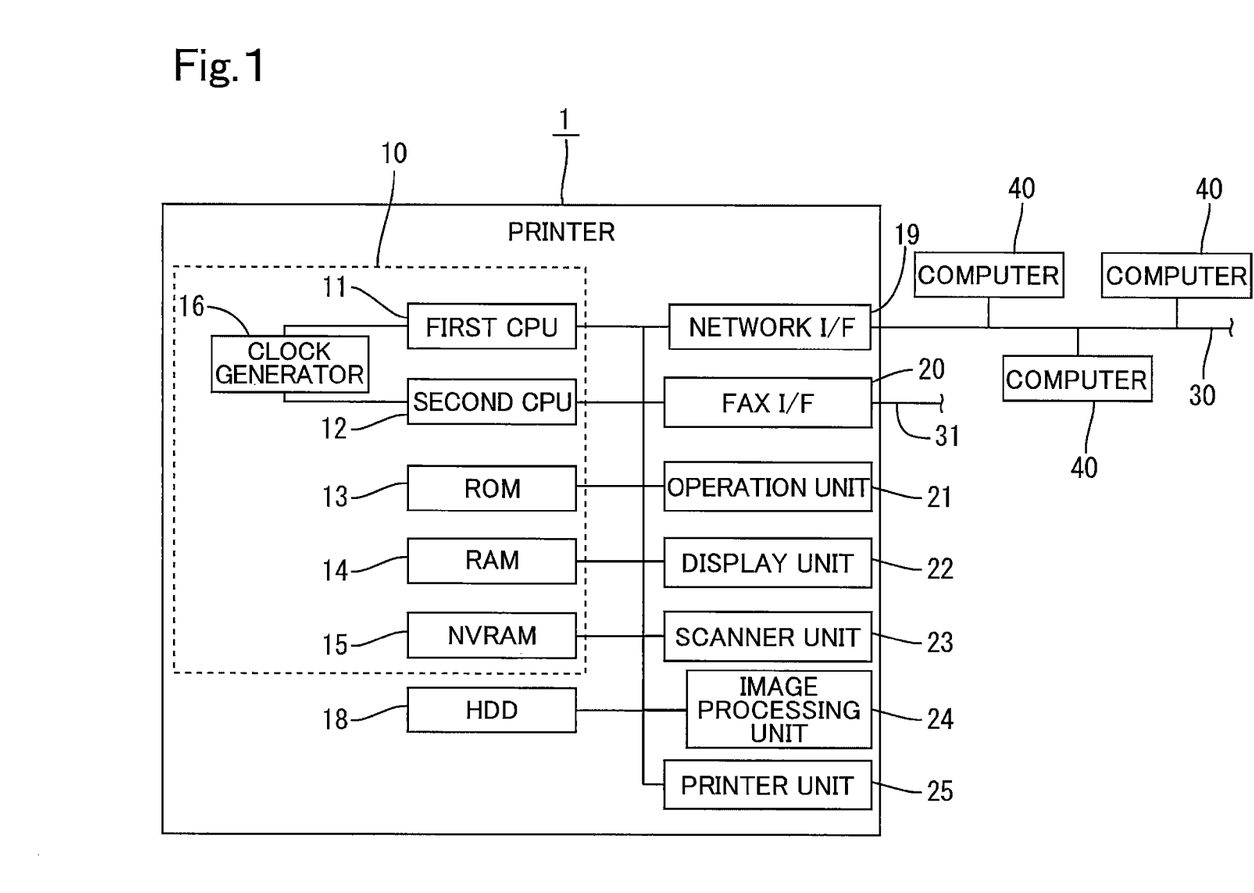
FIG. 1 a block diagram showing electrical configuration of a printer according to a first embodiment of the invention.

As shown in FIG. 1, the printer 1 includes a control unit 10 (obtaining unit, control unit, authentication unit, register unit) having two central processing units (CPUs) including a first CPU 11 and a second CPU 12. The control unit 10 also has a ROM 13, a RAM 14, a NVRAM 15, and a clock generator 16. The clock generator 16 provides operation clock to both the first CPU 11 and the second CPU 12.

The first CPU 11 has a higher processing capacity and consumes more energy than the second CPU 12. More specifically, the first CPU 11 is operated with a higher operation clock frequency than the second CPU 12, for example. Also, halting clock supply from the clock generator 16 to the first CPU 11 or the second CPU 12 turns OFF (sets into a sleep state) the first CPU 11 or the second CPU 12. The control unit 10 can be switched between a higher control mode where the first CPU 11 is ON (active state) and the second CPU 12 is OFF and a lower control mode where the first CPU 11 is OFF and the second CPU 12 is ON. In other words, the higher control mode has a higher performance capacity and the lower control mode has a lower performance capacity. Note that each of the first and second CPUs 11 and 12 in the active state can control each component of the printer 1. However, the first CPU 11 or the second CPU 12 does not control each component when in the sleep state.

The ROM 13 stores programs for operations of the printer 1, including programs for user authentication and a control mode switching process to be described later, and each of the first CPU 11 and the second CPU 12 controls operations of the printer 1 based on programs retrieved from the ROM 13.

The printer 1 further includes a hard disk drive (HDD) 18, a network interface (I/F) 19, a facsimile interface (FAX I/F) 20, an operation unit 21, and a display unit 22. The network I/F 19 (connection unit, communication unit) is connected to a communication circuit 30, such as a local area network (LAN). The communication circuit 30 is connectable to a plurality of external computers 40 (terminal devices), and the printer 1 communicates with the computers 40 and the like connected to the communication circuit 30 through the network I/F 19.

The FAX I/F 20 is connectable to such external devices (not shown) as facsimile devices through a telephone circuit 31, and the printer 1 can transmit and receive facsimile data to and from the external devices connected to the telephone circuit 31 through the FAX I/F 20. The operation unit 21 has a plurality of buttons (not shown) through which a user can input various commands, such as a job execution command. Although not shown in the drawings, the display unit 22 has a display and lamps (not shown) and can display various setting screens and operation status.

The printer 1 further includes such devices (processing units) as a scanner unit 23, an image processing unit 24, and a printer unit 25. The scanner unit 23 scans over an image on original and generates scanner data. The image processing unit 24 executes image processing (calibration, color conversion, and the like) on various image data, such as scanner data generated by the scanner unit 23 and print data received at the network I/F 19. The printer unit 25 prints images on a sheet (sheet of paper, OHP sheet, or the like) based on the image data in an electrophotographic method or an inkjet method, for example.

Figure 2:
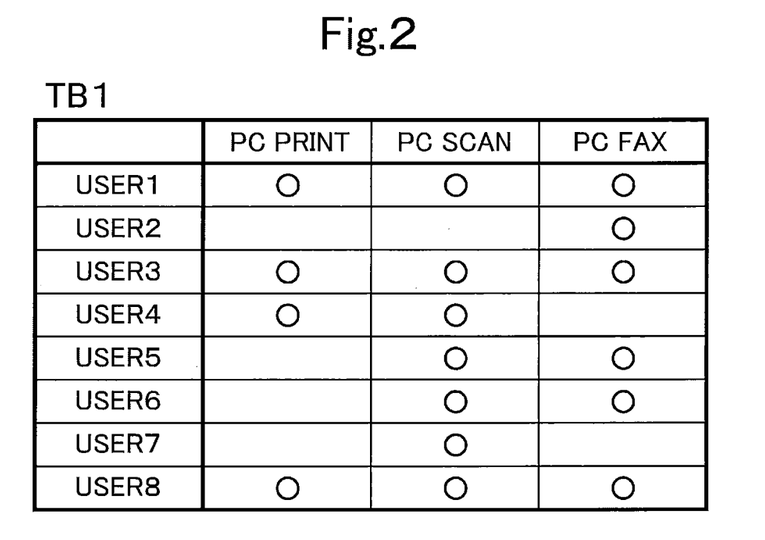
FIG. 2 is a view showing an execution-permission table according to the first embodiment of the invention.

Next, operations of the printer 1 will be described. The control unit 10 can receive a job from one of the computers 40 or the like connected to the network I/F 19. The job received at the network I/F 19 includes information specifying a type of function to be executed, settings of the function, and an address and a login username of the computer 40 from which the job is received. Upon receiving the job, the control unit 10 performs user authentication by referring to the information included in the job and based on an execution-permission table TB1 stored in the NVRAM 15, an example of which is shown in FIG. 2. As shown in FIG. 2, a plurality of users are registered on the execution-permission table TB1, and the execution-permission table TB1 indicates whether each of functions (three functions including a PC print function, a PC scan function, and a PC facsimile function, in this embodiment) is permitted or prohibited to be executed for each of the users registered on the execution-permission table TB1 (hereinafter referred to as "registered users"). In FIG. 2, "◯" indicates permission, and blank indicates prohibition. In this embodiment, a manager or the like operates the operation unit 21 to have the control unit 10 register users on the execution-permission table TB1 and set either permission or prohibition for each function for each registered user.

In the user authentication, the control unit 10 determines whether a user who has sent the job is one of the registered users. If the user is a registered user, then the control unit 10 determines whether execution of a function of the job is permitted for the user. However, if the user is not a registered user, or if the execution of the function is prohibited for the user, then the job is discarded.

If the user is a registered user and if the execution is permitted, then the control unit 10 registers the job in a queue, and the control unit 10 executes jobs in the queue basically in the order of registration. Also, a plurality of jobs that can be executed concurrently (PC print job and PC scan job, for example) are in the queue, then these jobs are executed concurrently.

Figure 3:
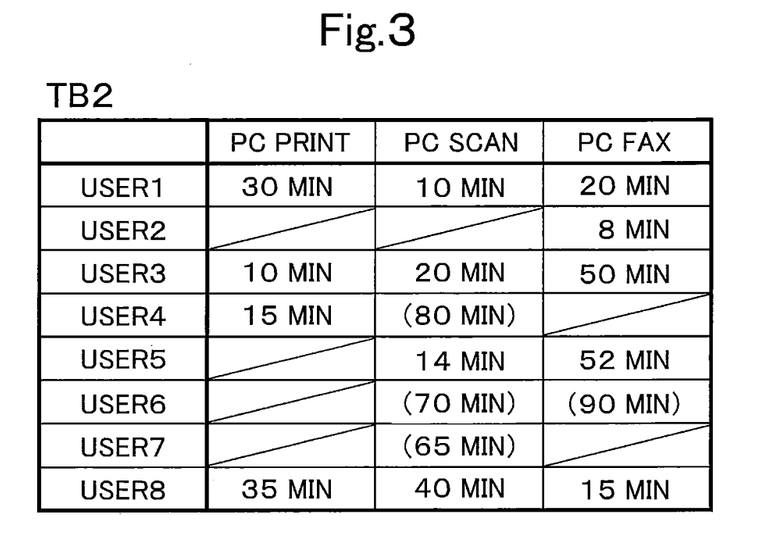
FIG. 3 is a view showing an access management table according to the first embodiment of the invention.

When registering the job in the queue, the control unit 10 also logs the time of job reception in an access management table TB2 stored in the NVRAM 15, an example of which is shown in FIG. 3. As shown in FIG. 3, the access management table TB2 stores, for each registered user, a non-accessed time of each permitted function, i.e., a duration of time elapsed since a job including the permitted function was last received from the user. More precisely, the access management table TB2 stores the time of the job reception. When referring to the access management table TB2, the control unit 10 obtains a non-accessed time by calculating the difference between the stored time and the current time, and stores the non-accessed time on the access management table TB2. Note that diagonal lines on the access management table TB2 shown in FIG. 3 indicate that corresponding functions are set to be prohibited on the execution-permission table TB1.

It should be noted that the user authentication is performed for one of the three functions upon reception of a job through the network I/F 19 in this embodiment, but the user authentication may also be performed for such functions as the copy function, the scanner function, and the facsimile transmission function upon reception of a job at the operation unit 21, by referring to the execution-permission table TB1 also storing settings for these functions. In this case, the access management table TB2 also stores non-accessed time for each of these functions, and also, the user authentication may be performed by having a user input a pre-registered password through the operation unit 21 or by reading user data from an user's ID card inserted in a card reader (not shown) before executing the job.

Next the control-mode switching process executed in the printer 1 will be described. The control-mode switching process is repeatedly executed by the control unit 10 at fixed intervals for obtaining a number of users of the printer 1 and for switching the control modes depending on the number of users. When the main power of the printer 1 is turned ON, the control unit 10 starts the control-mode switching process in the lower control mode, i.e., while the second CPU 12 is ON and the first CPU 11 is OFF.

Here, the number of users of the printer 1 indicates a number of users who might use the printer 1 or input jobs to the printer 1. The number of users is used for estimating future status of use of the printer 1, such as future frequency of job input, and does not necessarily match an actual number of users or a number of registered users.

Figure 4:
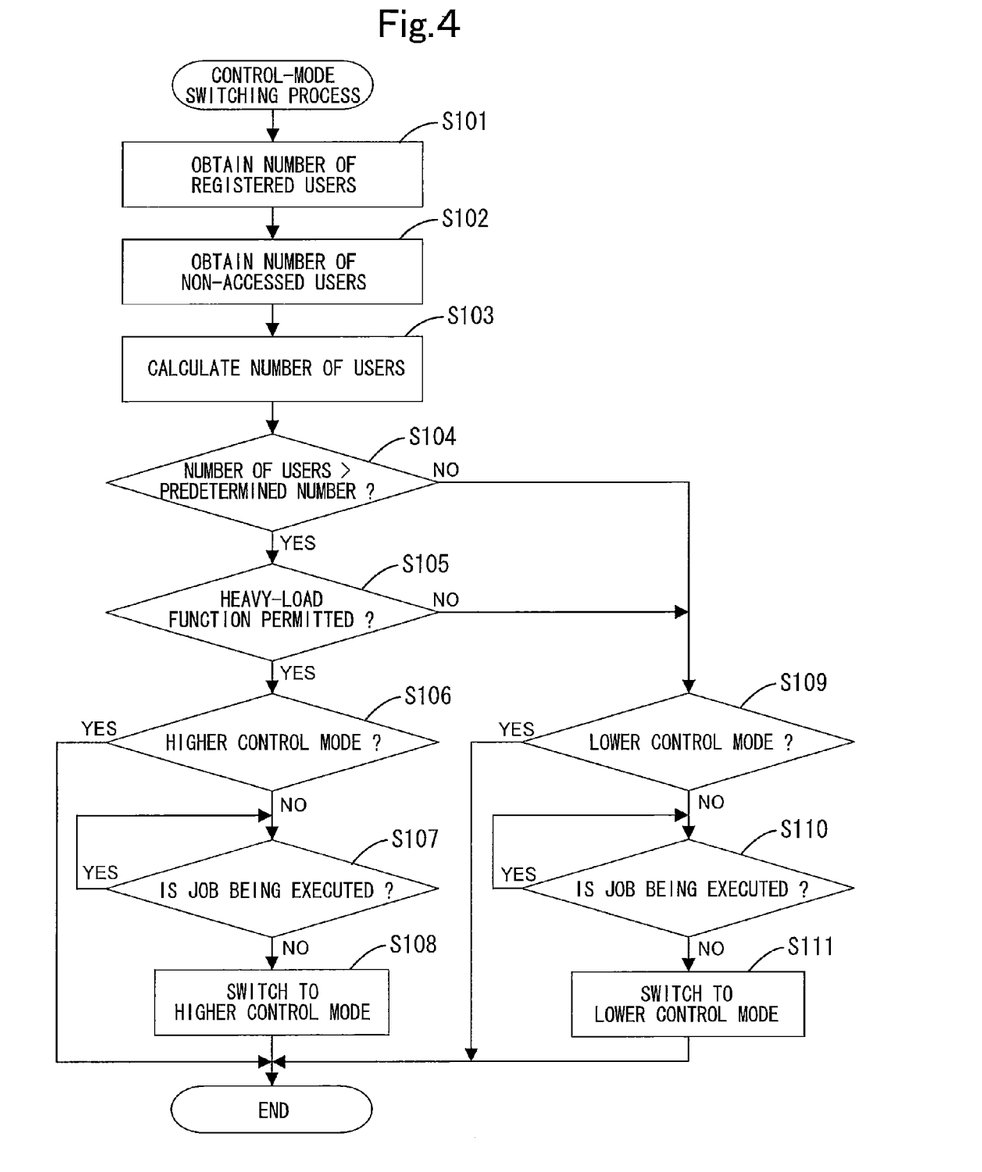
FIG. 4 is a flowchart representing a control-mode switching process according to the first embodiment of the invention.

As shown in FIG. 4, when the control-mode switching process is started, first in S101 the control unit 10 obtains a number of registered users (users registered on the execution-permission table TB1). Next in S102 the control unit 10 obtains a number of non-accessed users. More specifically, the control unit 10 refers to the non-accessed time stored on the access management table TB2 for each registered user for each permitted function, and determines a non-accessed function(s) for each registered user, which has not been executed for a certain duration of time (60 min, in this example). In order to facilitate understanding of the explanation, times exceeding 60 min are in parentheses in FIG. 3. Then, the control unit 10 determines a non-accessed user(s)

with all the functions being either prohibited or determined as the non-accessed function. In the example shown in FIG. 3, the permitted functions for the registered users 6 and 7 are all determined to be non-accessed functions. Thus, the number of non-accessed users is "2" in this example.

Next in S103 the control unit 10 obtains a number of users of the printer 1 by subtracting the number of non-accessed users from the number of registered users. In the example shown in FIGS. 2 and 3, the number of registered users obtained in S101 is "8," and the number of non-accessed users obtained in S102 is "2," so the number of users is calculated to be "6" (8−2=6).

Then, in S104, the control unit 10 determines whether or not the number of users is greater than a predetermined number. If so (S104:Yes), then in S105 the control unit 10 determines whether or not a heavy-burden function (PC print function, in this embodiment) is permitted for any user included in the number of users, by referring to the execution-permission table TB1. In other words, the control unit 10 determines in S105 whether there is a possibility of receiving a job including the heavy-burden function from a registered user who has not been determined to be the non-accessed user.

If so (S105:Yes), then the control unit 10 determines in S106 whether or not the current control mode is the higher control mode. If so (S106:Yes), then the control unit 10 ends the control-mode switching process. That is, if the number of users is greater than the predetermined number and if there is a possibility of receiving a job including the heavy-burden function, then the control unit 10 determines that the higher control mode is appropriate, and does not switch the control modes if already in the higher control mode.

On the other hand, if the current control mode is not the higher control mode (S106:No), this means that the current control mode is the lower control mode, and the control unit 10 determines in S107 whether any job is currently being executed. If not (S107:No), then the control unit 10 switches from the lower control mode to the higher control mode in S108 and ends the control-mode switching process. On the other hand, if so (S107:Yes), the control unit 10 repeats the determination in S107 until a negative determination is made.

When switching from the lower control mode to the higher control mode, the second CPU 12 in the active state stores necessary data into the RAM 14, and controls the clock generator 16 to start supplying the operation clock to the first CPU 11, thereby activating the first CPU 11. After activation, the first CPU 11 retrieves the necessary data from the RAM 14, takes over from the second CPU 12, and controls the clock generator 16 to halt clock supply to the second CPU 12, putting the second CPU 12 into the OFF state.

If a negative determination is made in either S104 or S105 (S104:No or S105:No), then the control unit 10 determines in S109 whether the current control mode is the lower control mode. If so (S109:Yes), then the control unit 10 ends the control-mode switching process. That is, if the number of users is not greater than the predetermined number or if there is no possibility of receiving of a job including the heavy-burden function, then the control unit 10 determines that the lower control mode is appropriate, and does not switch the control modes if already in the lower control mode.

On the other hand, if a negative determination is made in S109 (S109:No), then the control unit 10 determines in S110 whether or not any job is currently being executed. If not (S110:No), then the control unit 10 switches the control modes from the higher control mode to the lower control mode in S111 and ends the control-mode switching process.

On the other hand, if so (S110:Yes), then the control unit 10 repeats the determination in S110 until a negative determination is made.

When switching from the higher control mode to the lower control mode, the control unit 10 follows the same procedures as for switching from the lower control mode to the higher control mode with the first and second CPUs 11 and 12 reversed.

Figure 5:
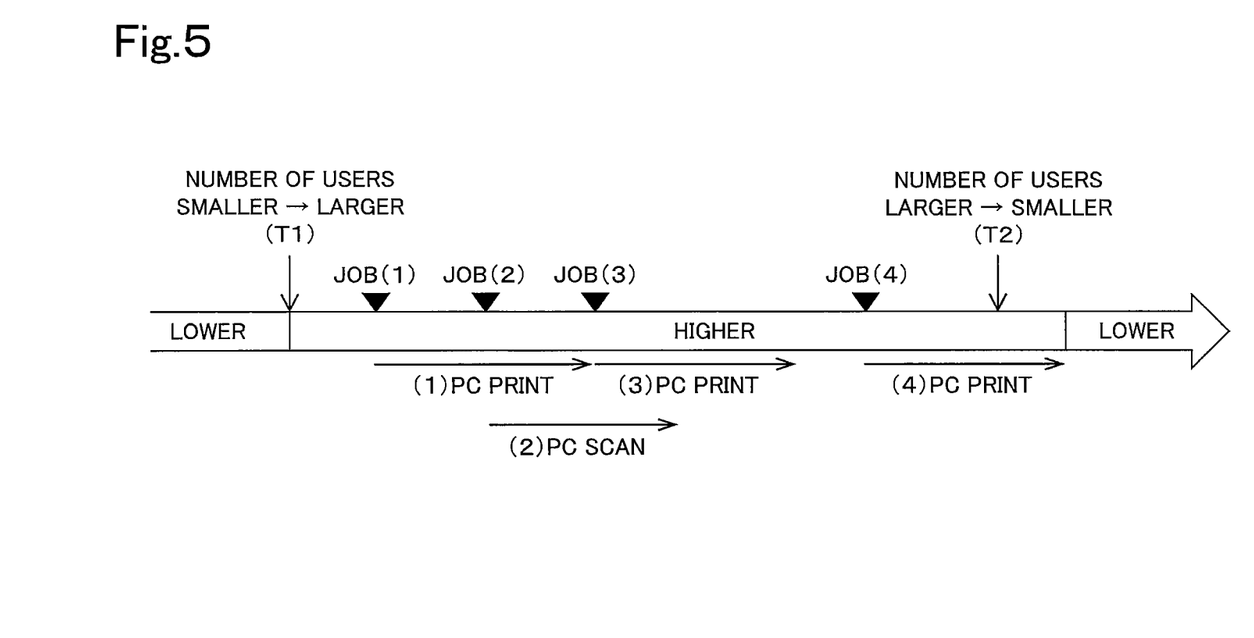
FIG. 5 is a time sequence diagram showing a control-mode switching operation according to the first embodiment of the invention.

FIG. 5 is a time sequence diagram explaining the control mode switching according to this embodiment. In FIG. 5, a period in the higher control mode is marked with "HIGHER," and a period in the lower control mode is marked with "LOWER." Here, it is assumed that the number of users is determined to be greater than the predetermined number in S104 of FIG. 4 at a timing T1 while in the lower control mode and that no job is being executed currently. In other words, it is assumed that the number of users, which has been determined to be equal to or less than the predetermined number in a previous control-mode switching process, is determined to be greater than the predetermined number in a current control-mode switching process. In this case, upon detecting that the number of users is greater than the predetermined number (in other words, at a timing of when the control unit 10 determines that the number of users is changed from "SMALLER" number" to "LARGER" number), the control unit 10 switches to the higher control mode. Then, if a PC print job (1), a PC scan job (2), and a PC print job (3) are input consecutively in a short period of time thereafter, the control unit 10 executes these jobs in sequence in the higher control mode. Note that the PC print job and the PC scan job are executed concurrently.

Then, if the number of users is determined to be equal to or smaller than the predetermined number in the control-mode switching process (i.e., when the number of users is changed to "SMALLER" number) at a timing T2 while a job (4) is being executed, the control unit 10 switches to the lower control mode after completing the job (4).

If the number of users is relatively large, a job may be received at a higher frequency, and there is a higher possibility of receiving of a plurality of jobs in a short period of time (possibility of receiving a job before another job completes). Switching to the higher control mode in such cases enables to execute jobs quickly.

That is, image data processing in association with such functions as the printing function, the scanner function, and the facsimile function can be executed faster in the higher control mode than in the lower control mode. Also, a conveying speed for conveying sheets of paper during printing may be set higher in the higher control mode than in the lower control mode, so as to shorten a time period required to print on a single sheet of paper. Thus, executing jobs in the higher control mode shortens the waiting time for users.

If the number of users is relatively small, on the other hand, a job may be received at a lower frequency, and there is a lower possibility of receiving of a plurality of jobs in a short period of time. Switching to the lower control mode in such cases saves power consumption. Although it may take loner time to execute a job in the lower control mode, overall waiting time for a user is relatively short because of a lower frequency of job input.

As described above, according to the first embodiment of the invention, the control modes are switched in accordance with the number of users. In other words, future status of use of the printer 1, such as a future frequency of job input, is estimated based on the number of users. Switching the control modes in accordance with the number of users enables an efficient control suited for the status of use of the printer 1.

Also, the control mode is set to the higher control mode having the higher performance capacity when the number of users is larger. In general, when the number of users is larger, the frequency of job input is larger, and the control unit 10 spends longer time in executing jobs, elongating the waiting time for users. However, setting to the higher control mode with the higher performance capacity when the number of users is larger shortens the waiting time for the users. Also, setting to the lower control mode with the lower performance capacity when the number of users is lower saves power consumption.

Because the number of users is determined based on the execution-permission table TB1 (authentication information) showing permission or prohibition for each user for each function, the number of users is obtained with accuracy.

Even if one or more of the functions is permitted for a user on the execution-permission table TB1, if the user has not executed the function(s) for the certain period of time, then the user is excluded from the number of users. Thus, a number suited to the actual status can be obtained as the number of users.

In this embodiment, the control mode is set to the higher control mode having the higher performance capacity when the load in executing the permitted functions is heavier. (In 105 of FIG. 4, the control mode is switched to the higher control mode if execution of a heavy-load function is permitted, but switched to the lower control mode if not permitted.) That is, when the execution load of a permitted function is heavier, it takes longer time to execute a corresponding job, elongating the waiting time for the user. Setting to the higher control mode when a load in executing the permitted function is heavier shortens the waiting time for the user.

Because the control modes are switched at a timing of when the number of users is obtained if no job is being executed, a job received thereafter can be executed in an appropriate control mode without first switching the control modes. For example, if the control modes are switched upon receiving a job, start of the job execution is delayed by switching the control modes. However, the configuration of the present embodiment can avoid such delay.

The control modes are switched by turning ON/OFF the first and second CPUs 11 and 12. Turning OFF either of the first CPU 11 and the second CPU 12 saves power consumption.

Because the control modes are switched by changing between the first CPU 11 and the second CPU 12 to be ON, the performance capacity of the control unit 10 can be changed, so the control unit 10 can use the capacity suited to the status of use of the printer 1.

Next, a printer according to a second embodiment of the invention will be described with reference to FIGS. 6 to 8. Note that the printer of this embodiment is identical to the printer 1 of the first embodiment, but differs in executing a control-mode switching process shown in FIG. 6 and in having a connected-PC-management table TB3 stored in the NVRAM 15, an example of which is shown in FIG. 7.

Figure 7:
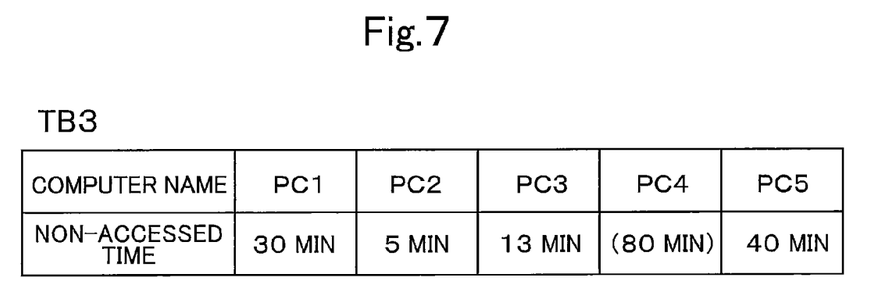
FIG. 7 is a view showing a connected-PC-management table according to the second embodiment of the invention.

The connected-PC-management table TB3 stores names of computers 40 (addresses) connected to the communication circuit 30 and a non-accessed time of each of the computers 40 (duration of time elapsed after a job was received from the computer 40), as shown in FIG. 7. More precisely, upon receiving a job from a computer 40 registered on the connected-PC-management table TB3, the control unit 10 records the time of job reception and resets the non-accessed time to "0 min" for the computer 40. If a job is received from a computer 40 which is not registered on the connected-PC-management table TB3, then the control unit 10 registers the computer 40 on the connected-PC-management table TB3, records the time of job reception, and records "0 min" as the non-accessed time for the computer 40.

The control-mode switching process according to this embodiment is for switching the control modes in accordance with a number of computers 40 connected to the printer, and is repeatedly executed by the control unit 10 at regular intervals. In this embodiment, the user authentication described in the first embodiment is not performed.

Figure 6:
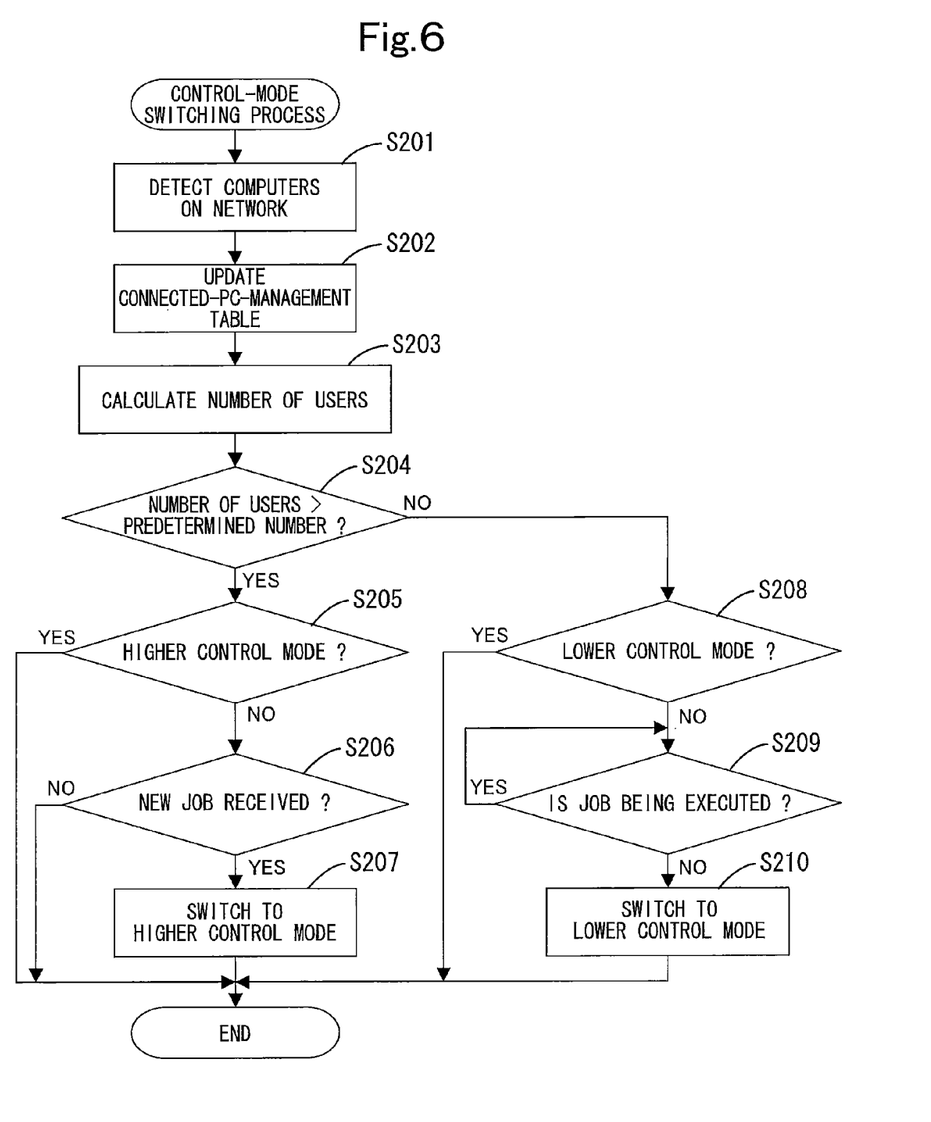
FIG. 6 is a control-mode switching process according to a second embodiment of the invention.

As shown in FIG. 6, when the control-mode switching process is started, first in S201 the control unit 10 detects the computers 40 connected to the communication circuit 30. More specifically, the control unit 10 broadcasts a request, such as a PING, through the network I/F 19, for example, and obtains addresses of responded computers 40.

Then, in S202, the control unit 10 updates the connected-PC-management table TB3 stored in the NVRAM 15 based on the addresses obtained in S201.

That is, in S202, the control unit 10 compares the detected computers 40 with the computers 40 registered on the connected-PC-management table TB3 (hereinafter referred to as "registered computers 40"), newly registers any detected computer 40 that does not match any of the registered computers 40, and deletes any registered computer 40 that does not match any of the detected computers 40 from the connected-PC-management table TB3. The control unit 10 also sets the non-accessed time to "0 min" for the newly registered computer 40.

Then, in S203, the control unit 10 determines non-accessed computers whose non-accessed times are greater than a certain time, and obtains a number of users by subtracting a number of non-accessed computers from a number of registered computers 40. For example, the number of registered computers 40 is "5" in the example shown in FIG. 7. Assuming that the certain time is 60 min, only a PC 4 (FIG. 7) is determined as a non-accessed computer, so the number of non-accessed computer is "1," and the number of users is determined to be "4."

In S204, the control unit 10 determines whether or not the number of users is greater than a predetermined number. If so (S204:Yes), then the control unit 10 determines in S205 whether the current control mode is the higher control mode. If so (S205:Yes), then the control unit 10 ends the control-mode switching process. That is, if the number of users is greater than the predetermined number, then the control unit 10 determines that the higher control mode is appropriate, and does not switch the control modes if already in the higher control mode.

On the other hand, if the current control mode is not the higher control mode (S205:No), this means that the current control mode is the lower control mode, and the control unit 10 determines in S206 whether or not a new job has been received. If not (S206:No), then the control unit 10 ends the control-mode switching process. On the other hand, if so (S206:Yes), then the control unit 10 switches to the higher control mode in S207. That is, switching from the lower control mode to the higher control mode is performed at the start of a job, but is not performed when no new job has been received.

If the number of users is equal to or less than the predetermined number (S204:No), then the control unit 10 determines in S208 whether or not the current control mode is the lower control mode. If so (S208:Yes), then the control unit 10 ends the control-mode switching process. That is, if the number of users is equal to or less than the predetermined number, then the control unit 10 determines that the lower control mode is appropriate, and does not switch the control modes if already in the lower control mode.

If the current control mode is the higher control mode (S208:No), then the control unit 10 determines in S209 whether or not a job is currently executed. If not (S209:No), then the control unit 10 switches from the higher control mode to the lower control mode in S210 and ends the control-mode switching process. On the other hand, if so (S209:Yes), then the control unit 10 repeats the process of S209 until a negative determination is made. That is, the control unit 10 switches to the lower control mode after the job completes.

Figure 8:
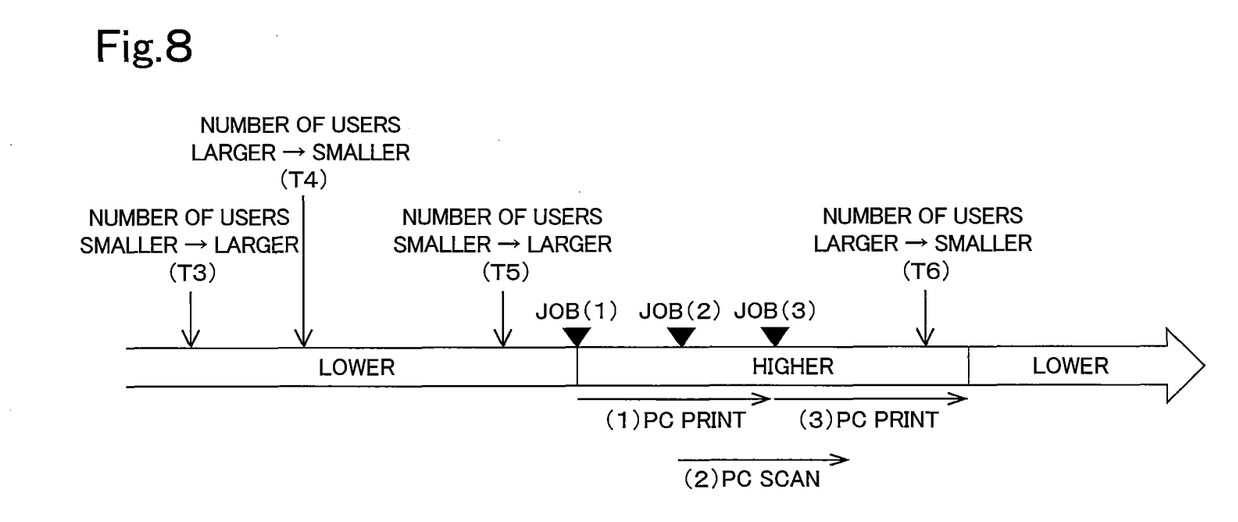
FIG. 8 is a time sequence diagram showing a control-mode switching operation according to the second embodiment of the invention.

For example, as shown in FIG. 8, even if the number of users is determined at a timing T3 to be changed from "SMALLER" number to the "LARGER" number in the control-mode switching process shown in FIG. 6 while a job is being executed in the lower control mode, the control mode is maintained the same. Thus, the number of users may be determined thereafter at a timing T4 to be changed from the "LARGER" number to the "SMALLER" number while still in the lower control mode. This means that power consumption was saved by avoiding an operation to switch to the higher control mode and then back to the lower control mode.

Also, in the example shown in FIG. 8, if a job (1) is received after the number of users is changed from "SMALLER" number to "LARGER" number at a timing T5 while no job is being executed, then the control mode is switched to the higher control mode at the timing of the start of the job (1). Thus, even if plural jobs (2) and (3) are received thereafter in a short period of time, all of the jobs (1) to (3) can be executed quickly.

When the number of users is determined to be changed from "LARGER" number to "SMALLER" number at a timing T6 while the job (3) is still being executed, then the control mode is switched to the lower control mode after the job (3) completes. That is, switching from the higher control mode to the lower control mode is performed without waiting for input of a new job, thereby saving power consumption.

As described above, according to the second embodiment, the number of computers 40 connected to the printer is determined as the number of users, and the control mode is switched based on the number of users. That is, future status of use of the printer, such as a future frequency of job input, is estimated based on the number of connected computers 40. Thus, switching the control modes based on the number of computers 40 realizes efficient control suited to status of use.

Because the number of users is obtained based on the number of computers 40, an appropriate number can be obtained as the number of users.

As described above, in this embodiment, the number of computers 40 is obtained based on responses sent from the computers 40 in response to the request. Thus, a number of computers 40 in an active state capable of sending jobs to the printer can be obtained with accuracy.

Also, even if the number of users is determined to be changed to the "LARGER" number, the control mode is not changed until a new job is received, so that the control mode is only switched to the higher control mode at the time of the start of the new job. It is useless to repeatedly switch the control modes while there is no job. Because in the present embodiment the control mode is switched at the time of the start of a job, such useless switching can be avoided.

It should be noted that the NVRAM 15 may store registration information identifying addresses and usernames of computers 40 having sent jobs to the printer, and the number of connected computers 40 or users of the printer may be obtained based on the registration information, without using the connected-PC-management table TB3. In this case, the number of computers 40 or users can be obtained easily without detecting the computers 40.

Also, in this case, the control unit 10 may record the time of job reception, obtain the non-accessed time, and exclude the non-accessed computer from the number of computers 40 or users. In this manner, a number suited to the actual status can be obtained as the number of computers 40 or users.

Figure 9:
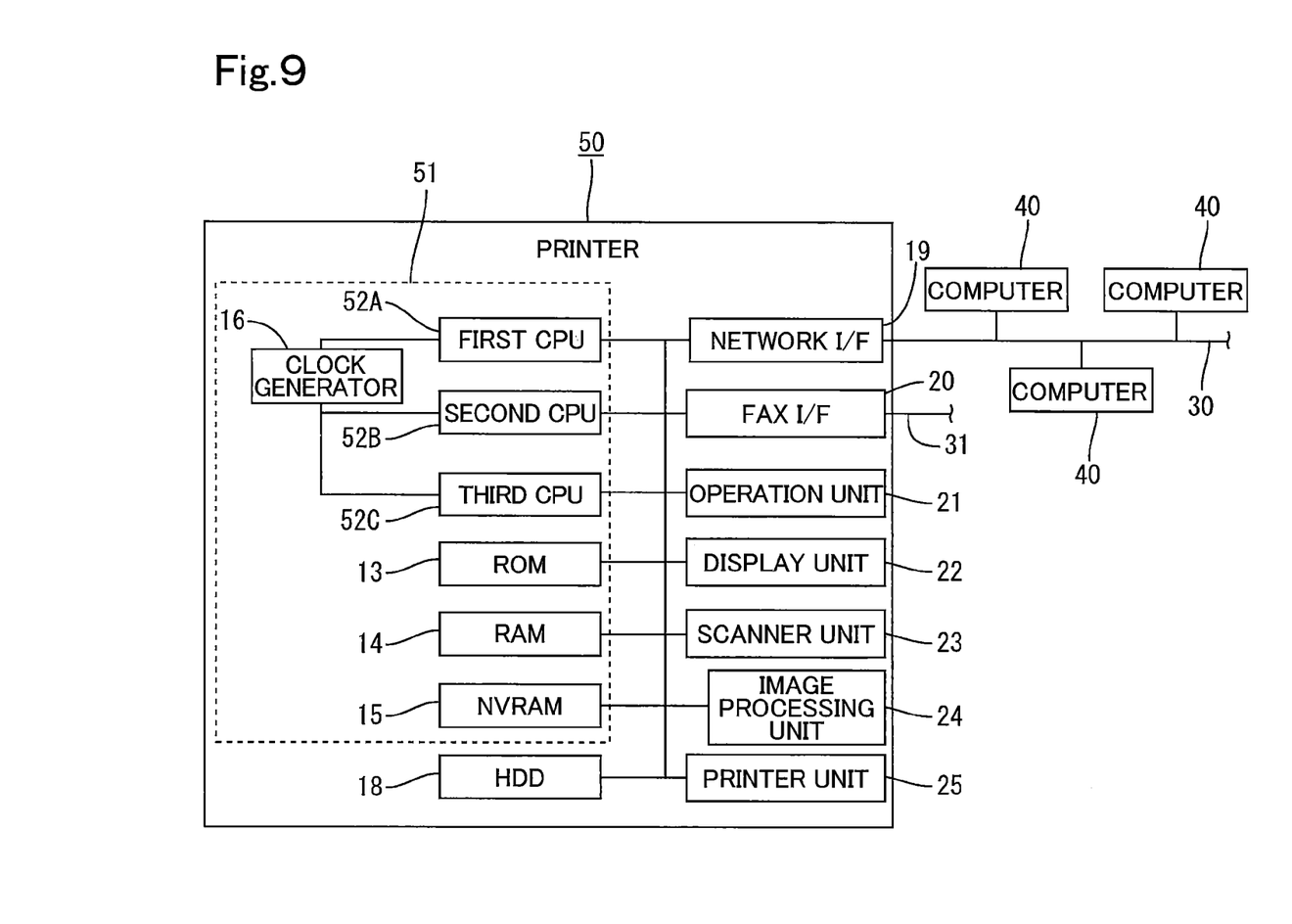
FIG. 9 is a block diagram showing electrical configuration of a printer according to a third embodiment of the invention.

Next, a printer 50 according to a third embodiment of the invention will be described with reference to FIGS. 9 to 11. The configuration of the printer 50 is the same as that of the printer 1 of the first embodiment, but differs in including a control unit 51 having a first CPU 52A, a second CPU 52B, and a third CPU 52C. All of the first to third CPUs 52A to 52C have the same processing capacities.

The control unit 51 can be switched between a lower control mode where only the first CPU 52A is in the active state, a medium control mode where the first CPU 52A and the second CPU 52B are in the active state, and a higher control mode where all three of the first, second, and third CPUs 52A, 52B, and 52C are in the active state.

Figure 10:
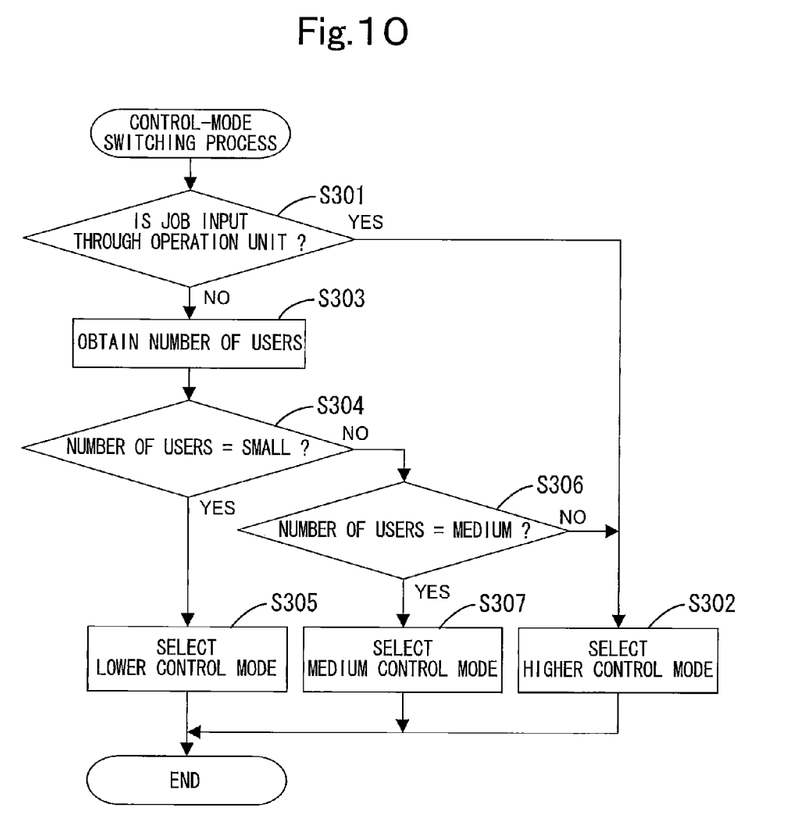
FIG. 10 is a control-mode switching process according to the third embodiment of the invention.

The control unit 51 also executes a control-mode switching process shown in FIG. 10. When the control-mode switching process starts, first in S301, the control unit 51 determines whether or not any job is received through the operation unit 21. If so (S301:Yes), in other words, if a job received through the operation unit 21 is in the queue or being executed, then the control unit 51 selects the higher control mode in S302.

That is, if the current control mode is either the medium control mode or the lower control mode, then the control unit 51 sets one or both of the second CPU 52B and the third CPU 52C currently in the sleep state into the active state. As a result, the control mode is switched to the higher control mode where all three of the first to third CPUs 52A to 52C are in the active state. However, if the current control mode is the higher control mode, then the control unit 51 does not switch the control modes. That is, in this control-mode switching process, if such a job as a copy job or a scan job is input through the operation unit 21, then the higher control mode having a highest performance capacity is selected, without regard to the number of users. Note that switching of the control modes is performed regardless of whether a job is being executed or not.

Figure 11:
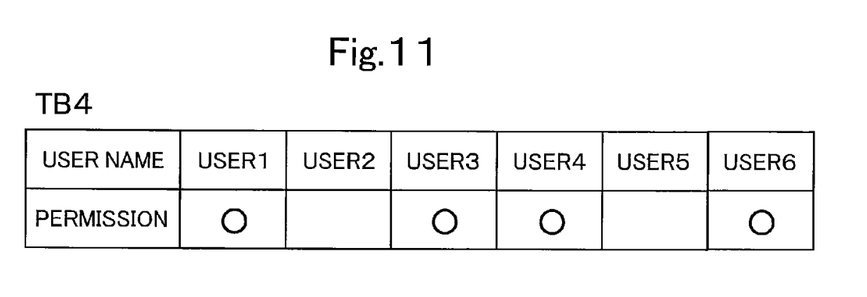
FIG. 11 is a view showing a permission table according to the third embodiment of the invention.

If no job is received through the operation unit 21 (S301:No), that is, if no job is in the queue or if only job received from the network I/F 19 or the like other than the operation unit 21 is being executed, then the control unit 51 obtains a number of users of the printer 50 based on a permission table TB4 (authentication information) stored in the NVRAM 15, an example of which is shown in FIG. 11.

As shown in FIG. 11, a plurality of users is registered on the permission table TB4, and the permission table TB4 stores information whether to permit or prohibit the use of the printer 50 (or job execution) for each registered user. In the permission table TB4, "○" indicates permission, and blank indicates prohibition. In this embodiment, a manager or the like operates the operation unit 21 to have the control unit 51 register users on the permission table TB4 and set either permission or prohibition for each registered user. Note that the control unit 51 performs user authentication based on the permission table TB4 upon receiving a job.

In order to obtain the number of users in S303, first the control unit 51 obtains a number of registered users allowed to use the control unit 51 by referring to the permission table TB4, and then sets the obtained number as the number of users. In the example of FIG. 11, the number of users is "4."

Next in S304 the control unit 51 compares the number of users with predetermined numbers, and determines whether or not the number of users falls in a category of small number. If so (S304:Yes), then the control unit 51 selects the lower control mode in S305. That is, if the current control mode is not the lower control mode, then the control unit 51 switches to the lower control mode.

On the other hand, if not (S304:No), then in S306 the control unit 51 determines whether or not the number of users falls in a category of medium number. If so (S306:Yes), then in S307, the control unit 51 selects the medium control mode. That is, if the current control mode is not the medium control mode, then the control unit 51 switches to the medium control mode. On the other hand, if not (S306:No), then this means that the number of users falls in a category of large number, and the control unit 51 proceeds to S302 to select the higher control mode.

After selecting one of the higher, medium, and lower control modes in one of S302, S305, and 305, the control unit 51 ends the control-mode switching process.

As described above, according to the preset embodiment, a control mode with a higher performance capacity is selected when the number of users is larger. Generally, when the number of users is larger, the frequency of job input is larger, and the control unit 51 spends longer time in executing jobs, elongating the waiting time for users. However, setting a control mode having a higher performance capacity when the number of users is larger shortens the waiting time for the users. Also, setting to a control mode with a lower performance capacity when the number of users is lower saves power consumption.

Also, because the number of users is obtained based on the permission table TB4 indicating permission or prohibition for each registered user, the number of users can be obtained with accuracy.

When a job is input through the operation unit 21, the higher control mode with the highest operation capacity is selected, without regard to the number of users. That is, when a job is input by a user through the operation unit 21, there is a danger that another user wanting to use the printer 50 may need to wait at the printer 50 until the job completes. In order to avoid such situations, the higher control mode is selected in this embodiment upon input of the job through the operation unit 21 so as to complete the job as soon as possible. The waiting time for the another user can be shortened in this manner.

Because the control mode is switched by changing the number of CPUs with the same processing capacities to be ON, a plurality of control modes with different performance capacities can be realized. Thus, the control unit 51 can use the capacity suited to the status of use.

While the invention has been described in detail with reference to the embodiments thereof, it would be apparent to those skilled in the art that various changes and modifications may be made therein without departing from the spirit of the invention.

For example, in the above-described embodiments, a multifunction device capable of executing different types of plurality of functions as jobs is described as an example of an image processing device. However, the present invention is applicable to an image processing device only capable of executing one type of function, and also to an image processing device having functions differing from the above-mentioned functions.

According to the above-described embodiments, the control unit 10 or 51 is switched between two or three control modes, but may be switched between four or more number of control modes.

In the above-described embodiments, the control mode is switched by changing ON/OFF of the CPUs. However, the control mode may be switched by controlling the clock generator 16 to change the frequency of the operation clock supplied to the CPUs. In general, increasing the clock frequency increases the processing capacity, and decreasing the clock frequency lowers power consumption. Also, switching of the control mode may be performed by changing both ON/OFF of the CPUs and clock frequency.

In the above-described embodiments, only ON/OFF of the CPUs is switched to change the control mode. However, a RAM and a ROM may be provided for each of the CPUs, and ON/OFF of the corresponding RAM and ROM may also be switched when switching ON/OFF of the CPU. Also, state and clock frequency of other components, such as an ASIC, may also be switched.

The number of users may be obtained at different timing than that described in the above embodiments. For example, the number of users may be obtained when a job is input, when a main power to the image processing device is turned ON, or at regular intervals (once every hour, for example), The number of connected terminal devices (computers 40) or users of the image processing device may be obtained in a different manner than that described in the above embodiments. For example, if authentication information, the number of connected computers 40, or the number of users is stored in an external device (server or the like), then the number of users or the like may be obtained based on information retrieved from the external device. Alternatively, a user or a manager of the image processing device may input the number of users or connected terminal devices into the image processing device. Still alternatively, requests may be output to terminal devices registered on authentication information or registration information stored in the image processing device so as to find terminal devices in active state.

Further, if frequency of job reception from a terminal device connected to the image processing device is notably high, then a number of users man be estimated larger than the number obtained in the above-described manner.

In the above-described first embodiment, a positive determination is made in S105 if there is at least one user permitted to execute the heavy-load function, and then the higher control mode is selected. However, even if there is a plurality of permitted users, the lower control mode may be selected if the number of the permitted users is less than a predetermined number.

In the above-described embodiment, the terminal devices are connected to the image processing device through the network I/F. However, the terminal devices may be alternatively connected to the image processing device in different methods (through USB interface, for example), and the image processing device may be configured to obtain a number of these terminal devices.

What is claimed is:

1. An image processing device comprising:
a processing unit configured to perform processing on image data;
a memory configured to store authentication information specifying one of permission and prohibition to execute a job for each registered user; and
a controller configured to:
obtain a number of registered users registered on the authentication information;

calculate a time duration between a job input time and a reference time for each registered user, the job input time indicating time when a job was last inputted;

obtain a number of non-accessed users selected from among the registered users and specified based on the calculated time duration exceeding a predetermined time duration;

obtain a number of accessing users by subtracting the number of non-accessed users from the number of registered users;

determine whether or not the number of accessing users obtained by subtracting the number of non-accessed users from the number of registered users exceeds a predetermined number; and execute a job by controlling the processing unit to perform the processing in a first control mode when the number of accessing users obtained by subtracting the number of non-accessed users from the number of registered users exceeds the predetermined number, and switch from the first control mode to a second control mode when the number of accessing users obtained by subtracting the number of non-accessed users from the number of registered users does not exceed the predetermined number, the first control mode being higher in performance capability than the second control mode.

2. The image processing device according to claim 1, wherein:

the processing unit is configured to perform plural types of processing corresponding to plural types of functions;

the controller is configured to execute the job by controlling the processing unit to perform a corresponding one of the plural types of processing;

the authentication information is configured to specify one of permission and prohibition for each of the plural types of functions for each registered user; and the controller is configured to obtain the number of users based on a number of registered users specified to be permitted for at least one of the plural types of functions in the authentication information.

3. The image processing device according to claim 2, wherein the controller is further configured to exclude a registered user who has not input a job including the at least one of the plural types of functions for a predetermined time duration from the number of users.

4. The image processing device according to claim 2, wherein the controller is further configured to determine whether a predetermined function is permitted for at least one of the users, wherein a load in executing the predetermined function is relatively heavy, and wherein the controller is configured to switch to a control mode having a higher performance capacity when the controller has determined that the predetermined function is permitted for at least one of the users.

5. The image processing device according to claim 1, further comprising an interface connectable to a plurality of terminal devices, each terminal device of the plurality of devices being configured to input a job to the image processing device, wherein the controller is configured to obtain the number of users based on a number of terminal devices connected to the interface.

6. The image processing device according to claim 5, wherein the controller is further configured to output a request to the plurality of terminal devices through the interface and obtains the number of users based on a number of terminal devices that respond to the request.

7. The image processing device according to claim 1, wherein the controller is further configured to register, on a registration information, at least one of a terminal device and a user that inputs a job, and wherein the controller is configured to obtain the number of users based on the registration information.

8. The image processing device according to claim 1, further comprising an operation unit through which a user can input another job, wherein the controller is further configured to receive the job from an external device, and wherein the controller is configured to switch to a control mode having a highest performance capability when the user inputs the another job through the operation unit, without regard to the number of users.

9. The image processing device according to claim 1, wherein the controller is configured to switch between the first control mode and the second control mode upon obtaining the number of users when no job is being executed.

10. The image processing device according to claim 1, wherein the controller is further configured to receive the job, and wherein the controller is configured to switch between the first control mode and the second control mode upon reception of the job.

11. The image processing device according to claim 1, wherein the controller includes a plurality of central processing units, and the controller is configured to switch between the first control mode and the second control mode by changing a status of at least one of the plurality of central processing units.

12. The image processing device according to claim 1, wherein the controller includes plural types of central processing units having different performance capabilities, and the controller is configured to switch between the first control mode and the second control mode by changing the type of central processing units to be ON.

13. The image processing device according to claim 1, wherein the controller includes a plurality of central processing units having the same performance capabilities, and the controller switches between the first control mode and the second control mode by changing a number of central processing units to be ON.

14. The image processing device according to claim 1, wherein the controller is further configured to authenticate a user based on authentication information specifying one of permission and prohibition of use of the image processing device for each registered user, and wherein the controller obtains the number of users based on a number of registered users specified to be permitted in the authentication information.

15. The image processing device according to claim 1, further comprising:

an image forming unit configured to form an image on a sheet;

a scanner unit configured to scan over an image and generate scanner data; and an interface configured to receive print data, wherein the processing unit is configured to implement both a print function on the print data with the image forming unit and a scanner function on the scanner data with the scanner unit, wherein the controller is configured to execute the job by controlling the processing unit to selectively implement the print function and the scanner function, wherein, in implementing the print function, the controller is configured to calculate the time duration between the job input time and the reference time, the job input time indicating time when a job corresponding to the print data was last inputted, wherein, in implementing the scanner function, the controller is configured to calculate the time duration between the job input time and the reference time, the job input time indicating time when a job corresponding to the scanner data was last inputted.

16. An image processing device comprising:

an interface configured to connect to a plurality of terminal devices, each of the plurality of terminal devices being configured to input a job to the image processing device;

a processing unit configured to perform processing on image data;

a memory configured to store a management table in which terminal devices are registered; and a controller configured to:

obtain a number of registered terminal devices registered on the management table;

calculate a time duration between a connection time and a reference time for each registered terminal device, the connection time indicating time when the registered terminal device last connected to the interface;

obtain a number of non-connected terminal devices selected from among the registered terminal devices specified based on the calculated time duration exceeding a predetermined time duration;

obtain a number of connected terminal devices by subtracting the number of non-connected terminal devices from the number of registered terminal devices;

determine whether or not the number of connected terminal devices obtained by subtracting the number of non-connected terminal devices from the number of registered terminal devices exceeds a predetermined number; and execute a job by controlling the processing unit to perform the processing in a first control mode when the number of connected terminal devices obtained by subtracting the number of non-connected terminal devices from the number of registered terminal devices exceeds the predetermined number, and switch from the first control mode to a second control mode when the number of connected terminal devices obtained by subtracting the number of non-connected terminal devices from the number of registered terminal devices does not exceed the predetermined number, the first control mode being higher in performance capability than the second control mode.

* * * * *